United States Patent
Zhang et al.

(10) Patent No.: US 8,724,605 B2
(45) Date of Patent: May 13, 2014

(54) MULTICAST VIDEO AND DATA DELIVERY WITH BEAMFORMING ANTENNAS IN INDOOR WIRELESS NETWORKS

(75) Inventors: Honghai Zhang, Ewing, NJ (US); Yuanxi Jiang, Anhui (CN); Sampath Rangarajan, Bridgewater, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 524 days.

(21) Appl. No.: 13/193,657

(22) Filed: Jul. 29, 2011

(65) Prior Publication Data

US 2012/0030716 A1 Feb. 2, 2012

Related U.S. Application Data

(60) Provisional application No. 61/368,755, filed on Jul. 29, 2010, provisional application No. 61/379,841, filed on Sep. 3, 2010.

(51) Int. Cl.
*H04W 84/12* (2009.01)
*H04W 4/06* (2009.01)
*H04B 7/26* (2006.01)

(52) U.S. Cl.
CPC ............... *H04W 84/12* (2013.01); *H04W 4/06* (2013.01); *H04B 7/2662* (2013.01)
USPC ........... 370/338; 370/312; 370/329; 370/350; 455/450

(58) Field of Classification Search
CPC ....... H04W 84/12; H04W 4/06; H04W 72/04; H04W 56/00; H04B 7/2662
USPC .......... 370/312, 235–237, 325–355; 455/450, 455/522
See application file for complete search history.

(56) References Cited

U.S. PATENT DOCUMENTS

| | | | |
|---|---|---|---|
| 2007/0165566 A1* | 7/2007 | Khan et al. ................... | 370/329 |
| 2010/0238851 A1* | 9/2010 | Sundaresan et al. .......... | 370/312 |
| 2010/0316058 A1* | 12/2010 | Gero et al. .................... | 370/401 |
| 2011/0116487 A1* | 5/2011 | Grandhi ........................ | 370/338 |

* cited by examiner

*Primary Examiner* — Ian N Moore
*Assistant Examiner* — Hien Nguyen
(74) *Attorney, Agent, or Firm* — Joseph Kolodka

(57) ABSTRACT

A method includes receiving input information related to transmission of video and data by an access point in a wireless network, the input information including at least one of setup connections, modulating and coding scheme MCS; receiving, by the access point, channel state each information from each user in the wireless network, the channel state information including signal-to-interference-and-noise-ratio SINR for each user under each beam pattern; and multicast beamform scheduling, responsive to the receiving, for multicast delivery of the video and data from the access point with beamforming antennas, the videos being at least one of a multi-resolution and a multi-layered video, the scheduling including a greedy procedure for selecting beams, assigning MCS and video layer or resolution to each of the beams.

11 Claims, 5 Drawing Sheets

MULTICAST VIDEO AND DATA DELIVERY WITH BEAMFORMING ANTENNAS IN INDOOR WIRELESS NETWORKS

This application claims the benefit of the following U.S. Provisional Applications: No. 61/368,755, entitled, "Multicast Video Delivery with Beamforming Antennas in Indoor Wireless Networks", filed Jul. 29, 2010; and U.S. Provisional Application No. 61/379,841, entitled, "Optimizing Multicast Delay and Switched Beamforming in Wireless Networks", filed Sep. 3, 2010, of which the contents both are incorporated herein by reference.

BACKGROUND OF THE INVENTION

The invention relates generally to broadband and wireless communications and more particularly to multicast video and data delivery with beamforming antennas in indoor wireless networks.

Wireless multicast is an efficient technique for delivering shared media and data such as mobile TV, sports telecast, video conferences, location-based services, software update and network management. Due to the shared nature of wireless medium, one multicast transmission can potentially reach all desired clients, thereby saving precious wireless resources. Nevertheless, wireless multicast also has limitations. One major limitation is the tradeoff between the transmission rate and the coverage. If an access point (AP) intends to transmit at a high transmission rate, only a small subset of users can receive the data. On the other hand, if an AP intends to cover all clients, it has to choose a rate, (a.k.a., modulation and coding scheme (MCS)), based on the client with the worst channel condition, thereby limiting its multicast throughput for all other users dramatically.

Prior works have considered exploiting switched beamforming to enhance wireless multicast transmission. However, these prior works studied the problem of minimizing the multicast transmission delay for a fixed size of data traffic. The problem that must be consider is one of scheduling switched beams to cover a group of clients with the objective of maximizing the total utility of all multicast clients subject to a total delay constraint, where the utility is a general measure of video quality or user-satisfaction. We consider the networks model assuming overlapping beam patterns and two video models: multi-resolution model and SVC (scalable video coding) model (also called multi-layered model). The key issue of this problem is the selection and scheduling of beams, MCS (modulation and coding scheme), and video resolution/layers.

Accordingly, there is a need for enhanced video delivery with beamforming antennas in indoor wireless networks that considers selection and scheduling of beams, MCS (modulation and coding scheme), and video resolution/layers.

BRIEF SUMMARY OF THE INVENTION

The present invention is directed to multicast video delivery with beamforming antennas in indoor wireless networks.

In a preferred embodiment of the invention, a method includes the steps of receiving input information related to transmission of video by an access point in a wireless network, the input information including at least one of setup connections, modulating and coding scheme MCS; receiving, by the access point, channel state each information from each user in the wireless network, the channel state information including signal-to-interference-and-noise-ratio SINR for each user under each beam pattern; and multicast beamform scheduling, responsive to the receiving, for multicast delivery of the video from the access point with beamforming antennas, the videos being at least one of a multi-resolution and a multi-layered video, the scheduling including a greedy procedure for selecting beams, assigning MCS and video layer or resolution to each of the beams.

These and other advantages of the invention will be apparent to those of ordinary skill in the art by reference to the following detailed description and the accompanying drawings.

DETAILED DESCRIPTION

The present invention is directed to enhanced video delivery with beamforming antennas in indoor wireless networks that considers selection and scheduling of beams, MCS (modulation and coding scheme), and video resolution/layers. It is NP-hard to have an approximation guarantee of $(1-1/e+\epsilon)$ for any given $\epsilon>0$ for the problem under both video conditions considered. The invention method is an efficient method to compute sub-optimal solutions. For the multi-resolution video situation, the invention is a unified approximation solution with a controlling parameter k, which controls both the complexity and the approximation factor of the algorithm. For k=0, 1, 2, 3, the resulting approximation factor is around 0.31, 0.38, 0.55, and 0.63, respectively. The method complexity grows exponentially with respect to the controlling parameter k. For scalable video coding SVC video situation, the inventive method is a similar heuristic solution based on the process for the multi-resolution situation.

Figure 1:
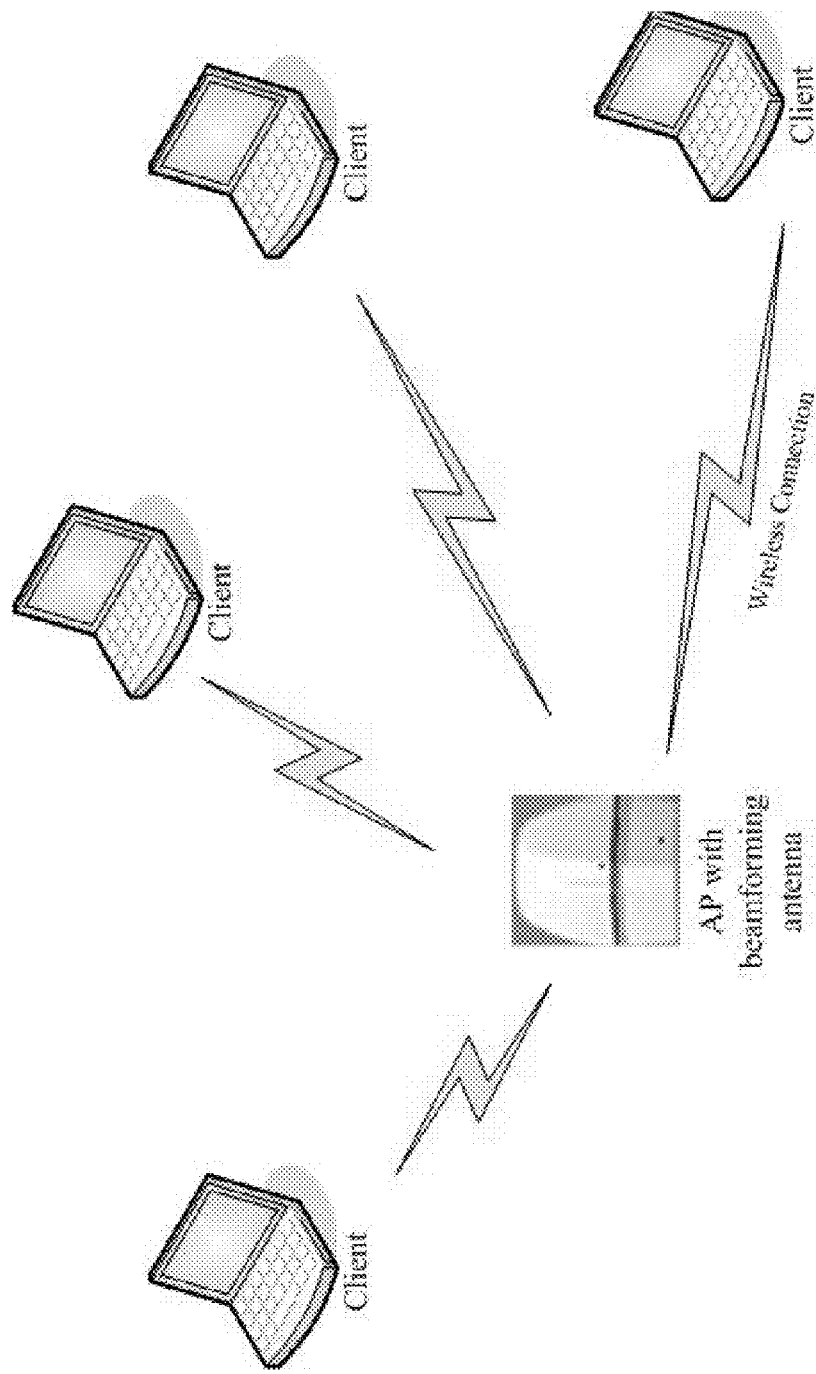
FIG. 1 depicts an exemplary wireless system including an access point with beamforming antenna serving multiple wireless clients, in accordance with the invention.
Figure 2:
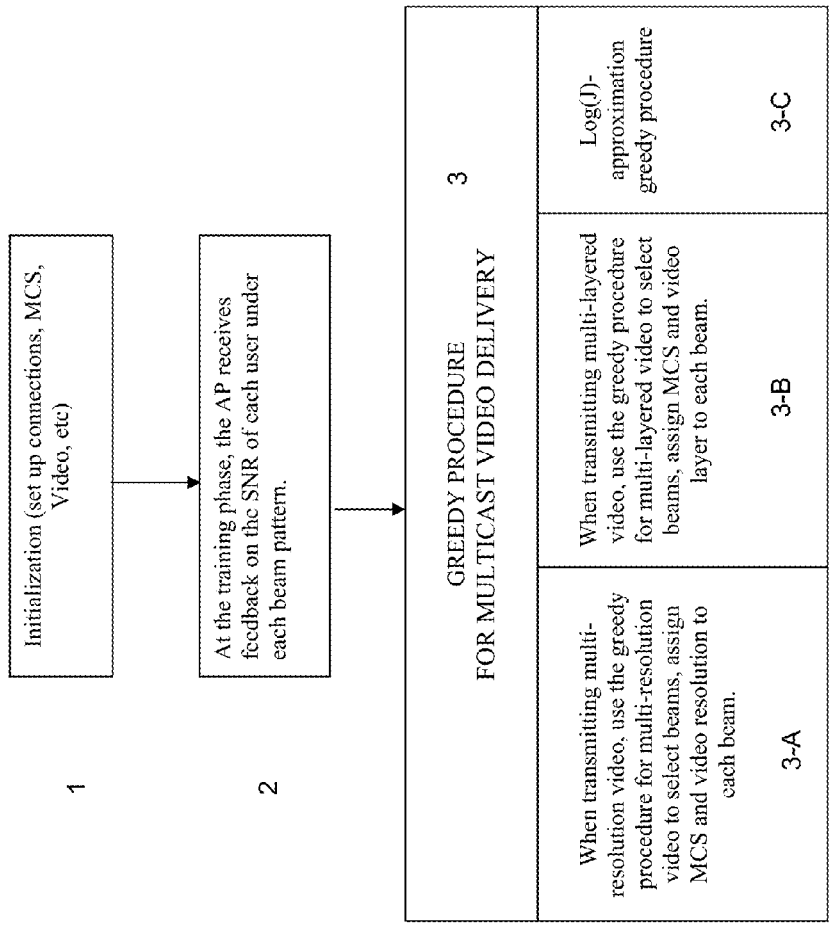
FIG. 2 is a block diagram depicting video multicast steps, in accordance with the invention.

Referring now to FIG. 2, a block diagram depicting video multicast steps, in accordance with the invention. The inventive method begins with initialization 1 that includes set up of the connections and the multicast video stream (multi-resolution or multi-layered) in the system. At the training phase 2, the AP receives channel state information from each user. The channel state information includes the average SINR (signal-to-interference-and-noise-ratio) for each user under each beam pattern.

In response to the channel state information, the invention uses a greedy procedure 3 for multi-resolution video (3-A), for multi-layered video (3-B) to select beam patterns and a log(J) approximation (for optimized video delivery), to assign MCS and video resolution/layer to each pattern, and to schedule multicast data transmission for video stream.

It is assumed that there are T slots available for the multicast video session, and B beam patterns which may overlap with each other and we do not assume any particular overlapping pattern. Thus, one user may receive data from multiple beams, each with a different SNR. We assume that the AP can choose the MCS and the beam pattern independently at each slot. Denote $r_m$ as the data rate of one slot with MCS m, m=1, ..., M.

At the training phase, the AP transmits pilot signals with each beam pattern. Every user i measures the channel SNR under each beam and reports to the access point his/her SNR value $\gamma_b^i$ under each beam b. We assume a discrete MCS and rate table; if $\bar{\gamma}_m \leq \gamma_i^b \leq \bar{\gamma}_{m+1}$, then user i can receive MCS up to m but not higher from beam b.

We denote variable $\chi_m^{b,l}$ as an indicator variable which is 1 if beam b is selected to transmit the video resolution l or layer l with MCS m, and 0 otherwise. As only one MCS can be chosen for a video resolution l or a layer l and beam b, we have $$\sum_{m=1}^{m} \chi_m^{b,l} \leq 1. \quad (1)$$

The delay of transmitting layer 1 (or resolution 1) with MCS m (regardless of which beam) is $$\left\lceil \frac{\lambda_1}{r_m} \right\rceil.$$

Therefore, the total time constraint indicates $$\sum_{b=1}^{B} \sum_{m=1}^{M} \sum_{l=1}^{L} \chi_m^{b,l} \left\lceil \frac{\lambda_l}{r_m} \right\rceil \leq T. \quad (2)$$

In a multi-resolution video model, it is assumed that the content server has multiple copies of the video with different resolutions (e.g. high/normal/low resolutions), which are achieved by encoding the video at different source rates $\lambda_1 \leq \lambda_2 \leq \ldots \leq \lambda_L$, where L is the number of resolutions. If a user j receives the video with source rate $\lambda_l$, he/she obtains a certain video quality and receives a user-specific utility $\mu_j^1$ satisfying $\mu_j^1 \leq \mu_j^2 \leq \ldots \leq \mu_j^L$. If a user does not receive the video at any resolution, he/she gets a received video rate $\lambda_0 = 0$ and a utility $\mu_j^0 = 0$. Note that one beam may be selected to transmit multiple times (for example, once at a higher video resolution with higher MCS to cover nearby users and another time at a lower video resolution with lower MCS to cover remote users). Nevertheless, it is not needed to transmit on a beam firstly at a higher video resolution with lower MCS and secondly at a lower video resolution with higher MCS because the former covers a larger set of users with better video quality than the latter, rendering the second transmission useless.

The maximum video resolution a user j can receive is $$\hat{l}_j = \max\left\{l : \sum_{m=1}^{M} \sum_{b:\gamma_j^b \geq \bar{\gamma}_m} \chi_m^{b,l} \geq 1\right\}. \quad (3)$$

The utility obtained by user j is then $\mu_j^{\hat{l}_j}$. Thus, the total system utility is $\sum_{j=1}^{J} \mu_j^{\hat{l}_j}$. The problem is hence formulated as $$\text{maximize} \sum_{j=1}^{J} \mu_j^{\hat{l}_j} \text{ subject to (1) and (2)}$$

where the optimization variables are $\chi_m^{b,l}$.

Figure 3A:
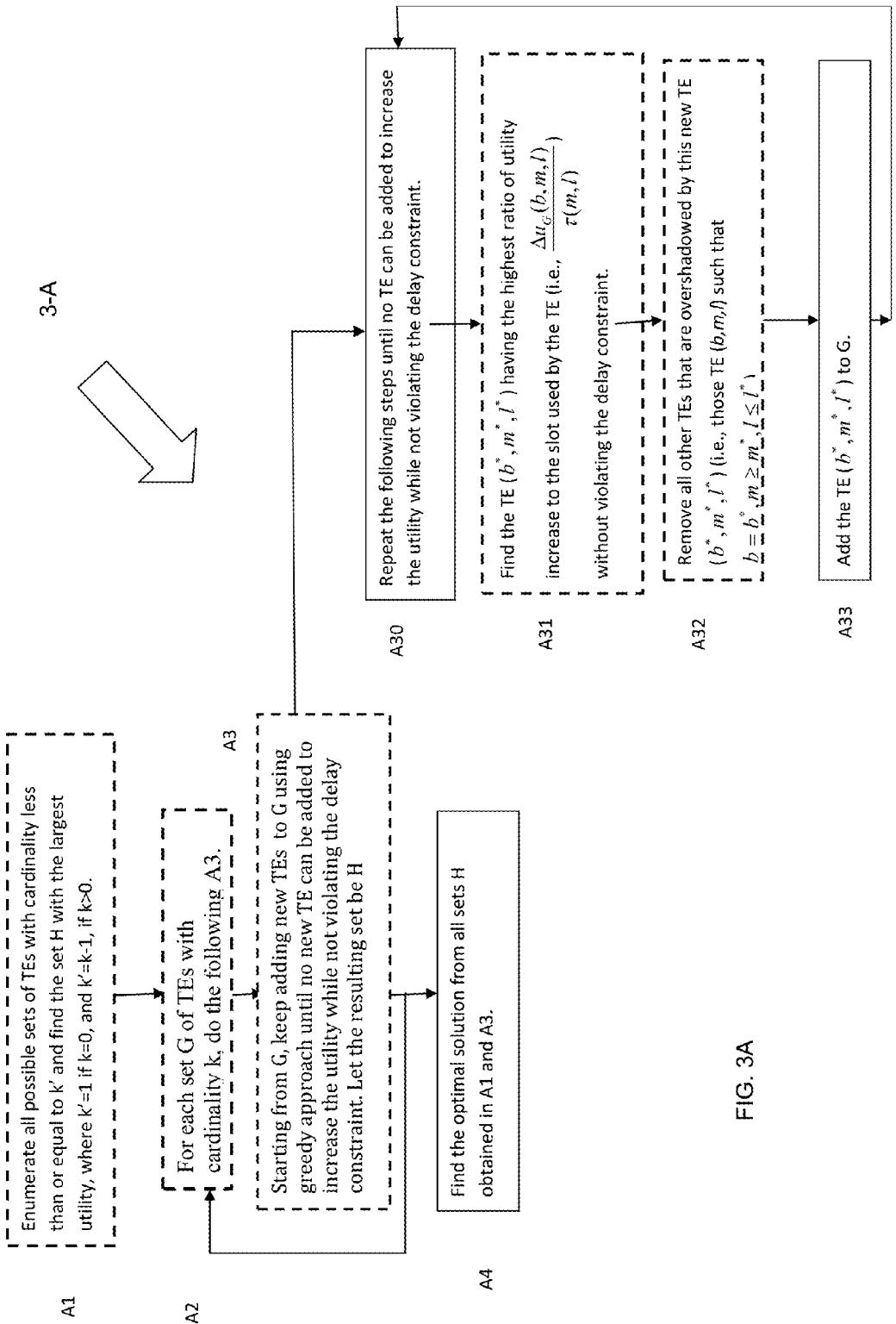
FIG. 3A is a flow diagram detailing step 3-A of FIG. 2, in accordance with the invention.

The steps for multi-resolution video scheduling with greedy procedure is shown in FIG. 3A. We define a Transmit Element (TE) as a 3-tuple (b, m, l) which indicates the beam b is selected to transmit resolution l with MCS m. G denotes set of TEs. Denote k as a controlling parameter.

Initially, A1, we enumerate all possible sets of TEs with cardinality less than or equal to k' and find the set H with the largest utility, where k'=1 if k=0, and k'=k−1, if k>0. For each set G of TEs with cardinality k, do the following step A3. At step A3, starting from G, keep adding new TEs to G using greedy approach until no new TE can be added to increase the utility while not violating the delay constraint. Let the resulting set be H. At step A4, find the optimal solution from all sets H obtained in A1 and A3.

The greedy approach in step A3 begins with step A30, repeating the following steps until no TE can be added to increase the utility while not violating the delay constraint. At step A31, Find the TE (b*,m*,l*) having the highest ratio of utility increase to the slot used by the TE $$\left(\text{i.e., } \frac{\Delta u_G(b, m, l)}{\tau(m, l)}\right)$$

without violating the delay constraint. At step 32, remove all other TEs that are overshadowed by this new TE (b*,m*,l*) (i.e., those TE (b,m,l) such that b=b*,m≤m*,l≤l*). Lastly, at step A33, Add the TE (b*,m*,l*) to G.

In a multi-layered video model, the video is encoded with Scalable Video Coding and consists of a base layer and multiple enhancement layers. Assume that the layer l has video source rate $\lambda_l$, l=1, ..., L. All layers lower than l are needed in order to successfully decode the video layer l. We call a layer l is valid for a client if layers 1 to l are all successfully received by the client. If a client j receives layers 1 to l but not l+1, he/she receives a utility $\mu_j^l$, which is again user-specific. Also note that a beam may be selected to transmit multiple times, each for a different layer. Nevertheless, it is not needed to transmit the same layer using the same beam multiple times.

We also denote $\hat{l}_j$ as the highest valid layer for user j. The utility obtained by user j is then $\mu_j^{\hat{l}_j}$. The problem is hence formulated as $$\text{maximize} \sum_{j=1}^{J} \mu_j^{\hat{l}_j} \text{ subject to (1) and (2).}$$

Figure 3B:
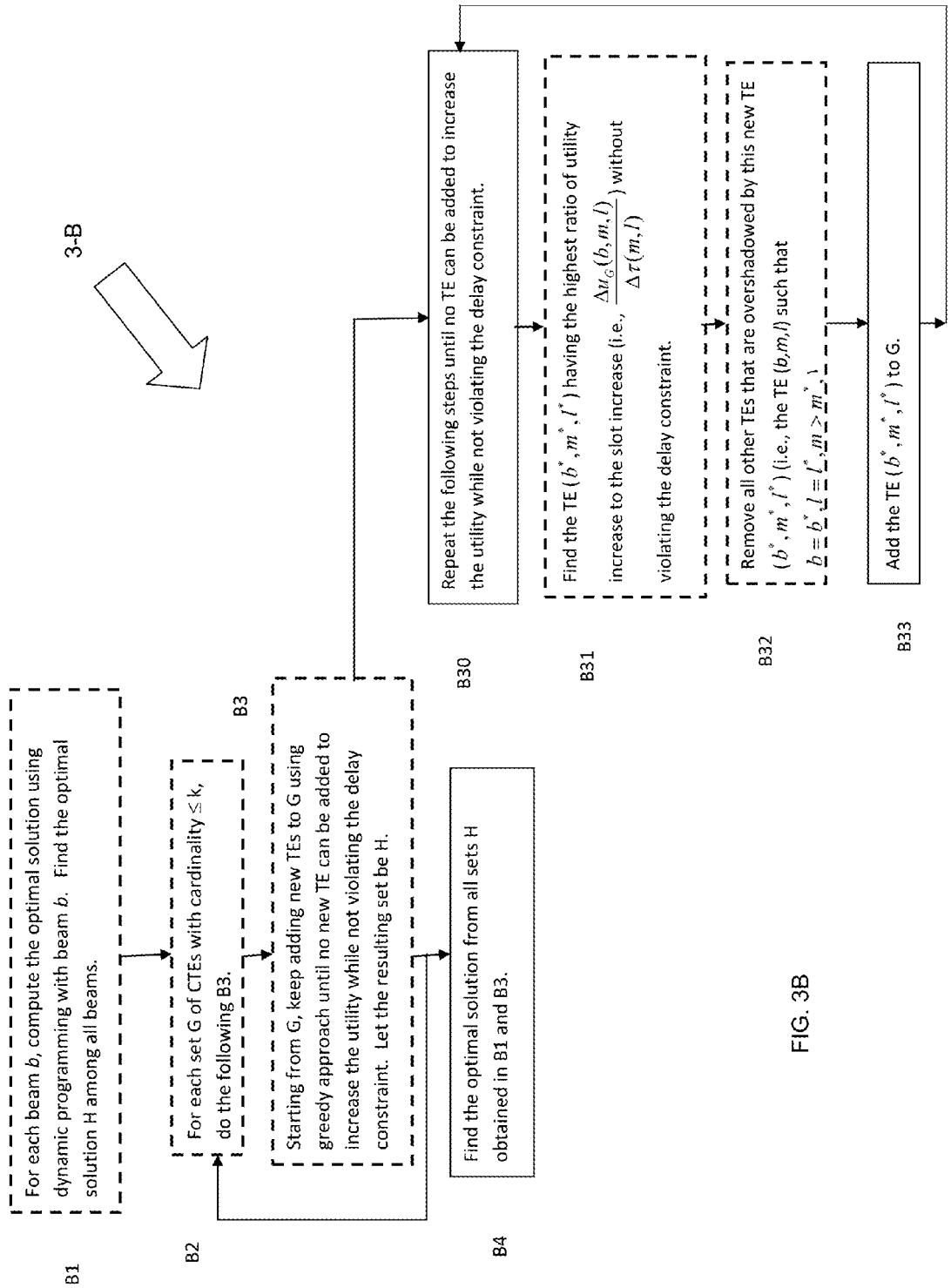
FIG. 3B is a flow diagram detailing step 3-B of FIG. 2, in accordance with the invention.
Figure 3C:
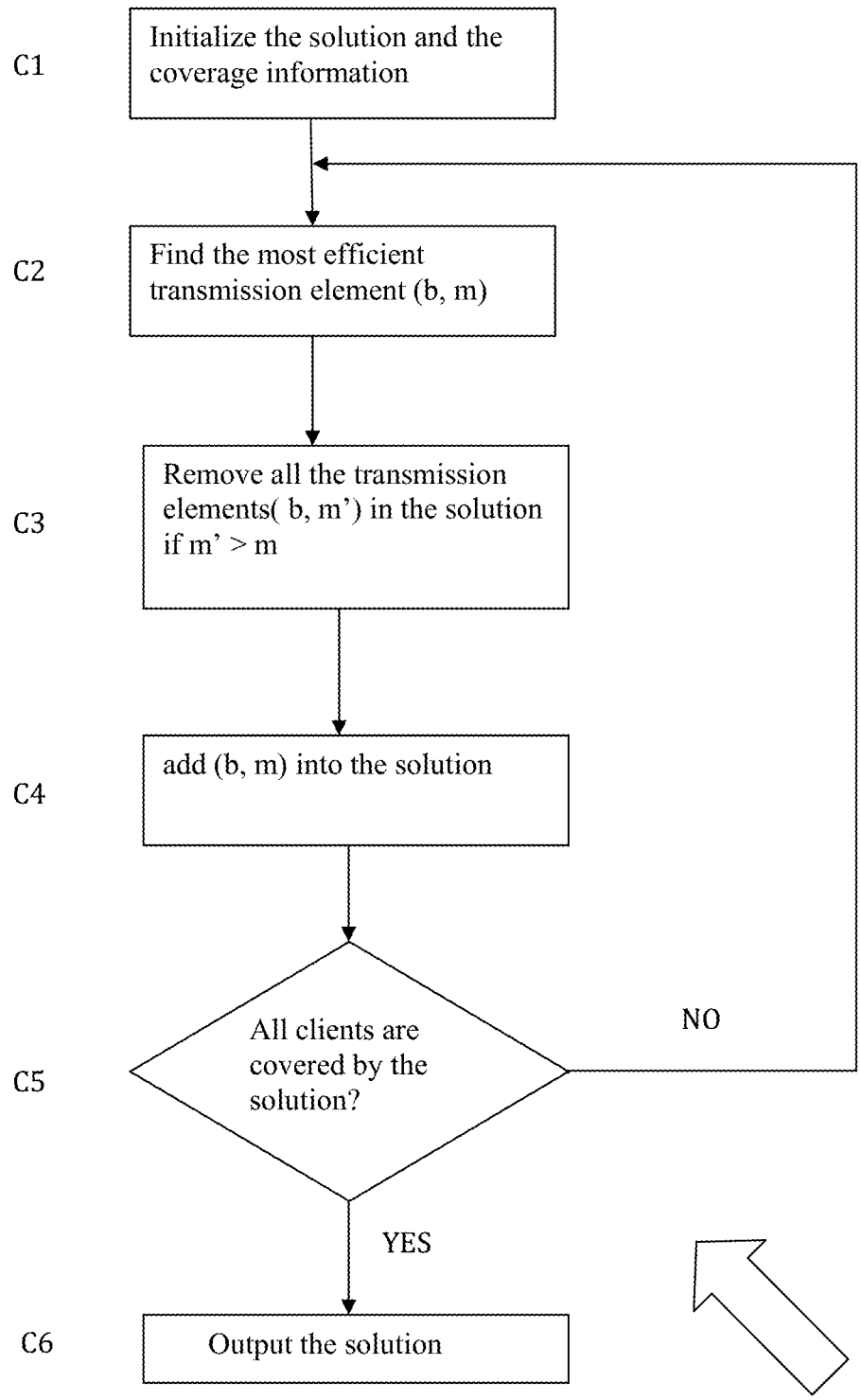
FIG. 3C is a flow diagram detailing step 3-C of FIG. 2, in accordance with the invention.

The steps for multi-layered video scheduling are shown in FIG. 3B. Here a Transmit Element (TE) as a 3-tuple (b,m,l) refers to that the beam b is selected to transmit layer l with MCS m. There is defined a Compound Transmit Element (CTE) (b,m,1~l) as set of TEs that have the same b and m but include all layers equal to or less than l. In other words, (b,m,1~l)=∪{(b,m,l'):1≤l'≤l}. Denote k as a controlling parameter.

Initially, at step B1, for each beam b, there is computed the optimal solution using dynamic programming with beam b. The procedure then proceeds to find the optimal solution H among all beams. At step B2, for each set G of CTEs with cardinality ≤k, do the following step B3. At step B3, starting from G, keep adding new TEs to G using greedy approach until no new TE can be added to increase the utility while not violating the delay constraint. Let the resulting set be H. At step B4, find the optimal solution from all sets H obtained in B1 and B3.

The greedy approach in step B3 begins with step B30, repeat the following steps until no TE can be added to increase the utility while not violating the delay constraint. At step B31, find the TE (b*,m*,l*) having the highest ratio of utility increase to the slot increase $$\left(\text{i.e., } \frac{\Delta u_G(b, m, l)}{\Delta \tau(m, l)}\right)$$

without violating the delay constraint. At step B32, remove all other TEs that are overshadowed by this new TE (b*,m*,l*) (i.e., the TE (b,m,l) such that b=b*,l=l*,m>m*,). At step B33, add the TE (b*,m*,l*) to G.

A log(J) approximation greedy approach is used to select beams and assign MCS to provide for optimizing delay in the multicast data and video delivery with switched beamforming antennas.

At step C1, initialize the solution and the coverage information. A←φ, U←φ. A is the solution set of TEs, U is the set of clients that covered by A. Client j is covered by transmission element (b, m), if $\gamma_j^b > \bar{\gamma}_m$, where $\gamma_j^b$ is the SNR value of client j when beam b is employed and $\bar{\gamma}_m$ is the minimum SNR value for a client to be able to receive MCS m. Client j is covered by A, if j is covered by at least one TE in A. At step C2, find the most efficient transmission element (b,m). The normalized cost of TE (b, m) is computed as $$\frac{\left\lceil \frac{L}{r_m} \right\rceil}{S_A(b, m)},$$

where L is the data length, $r_m$ is the channel rate of one slot with MCS m, $S_A$ (b, m) is the set of the clients who are not previously covered by A but are covered by the TE (b, m). The most efficient TE is the TE with the smallest normalized cost. At step C3, remove useless TEs from solution A. More specifically, remove all the transmission elements (b, m') in the solution if m>m'. At step C4, add (b,m) into the solution: A←A∪{(b,m)}, U←U∪$S_A$ (b,m). At step C5, repeat finding and adding the most efficient TE until all the clients are covered by A. At step C6, output the solution.

From the foregoing, it can be appreciated that the invention provides superior multicast video delivery in a manner that allows for arbitrary beams with various shapes and sizes and wireless clients receiving different rates from different beams.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

The invention claimed is:

1. A method comprising the steps of:
receiving input information related to transmission of at least video or data by an access point in a wireless network, said input information including at least one of setup connections, modulating and coding scheme (MCS);

receiving, by said access point, channel state each information from each user in said wireless network, said channel state information including signal-to-interference-and-noise -ratio S1 NR for each said user under each beam pattern; and multicast beamform scheduling, responsive to said receiving, for multicast delivery of said at least video or data from said access point with beamforming antennas, said videos being at least one of a multi-resolution and a multi-layered video, said scheduling including a greedy procedure for selecting beams, assigning MCS and video layer or resolution to each of said beams wherein said multicast beamform scheduling comprises enumerating all possible sets of transmit elements TEs with cardinality less than or equal to k' and find the set H with the largest utility, where k'=1 if k=0, and k'=k−1, if k>0, with TE being a transmit element defined as a 3-tuple (b,m,l) which indicates the beam b is selected to transmit resolution I with MCS m, and k denoting a controlling parameter.

2. The method of claim 1, said multicast beamform scheduling comprises starting from G, a set of TEs, keep adding new TEs to G using a greedy procedure until no new TE can be added to increase the utility while not violating the delay constraint, and the resulting set being denoted as H.

3. The method of claim 2, wherein said greedy procedure comprises finding the TE (b*, m*, l*) having the highest ratio of utility increase to the slot used by the TE, being $$\frac{\Delta u_G(b, m, l)}{\tau(m, l)},$$

without violating the delay constraint r(m,/).

4. The method of claim 3, wherein said greedy procedure comprises removing all other TEs that are overshadowed by a new said TE (b*, m*, l*), being those TE (b,m,l) in G such that b=b*, m≤m*, l≤l*.

5. The method of claim 1, wherein said multicast beamform scheduling comprises for each beam b, compute an optimal solution using dynamic programming with beam b and finding an optimal solution H among all beams.

6. The method of claim 5, wherein said multicast beamform scheduling comprises starting from G, being a set of compound transmit element (CTEs), adding new TEs to said G using a greedy approach until no new TE can be added to increase the utility while not violating the delay constraint, and the resulting set being H, with a transmit element (TE) defined as a 3-tuple (b,m,l) and that refers to said beam b that is selected to transmit layer I with MCS m, and a compound transmit element (CTE) (b,m,l-l) being defined as set of TEs that have the same b and m but include all layers equal to or less than 1.

7. The method of claim 6, wherein said greedy procedure comprises finding the TE (b, m, l*) having the highest ratio of utility increase to the slot increase, being $$\frac{\Delta u_G(b, m, l)}{\Delta \tau(m, l)},$$

without violating a delay constraint.

8. The method of claim 7, wherein said greedy procedure comprises removing all other said TEs that are overshadowed by this new TE (b*, m*, l*), being those said TE (b,m,l) such that b=b*,l=l*,m>m*,.

9. The method of claim 1, wherein said greedy procedure comprises an approximation greedy process including initializing a solution and coverage information for said scheduling, finding most efficient transmission element TE (b,m) where b is selected to transmit with MCS m, removing all TEs (b,m') in said solution if m'>m, and adding TE (b,m) into said solution, and outputting said solution if all wireless users are covered by said solution, otherwise repeating said approximation from finding most efficient transmission element (b,m).

10. The method of claim 9, wherein said initializing a solution comprises A←φ, U←φ, where A is the solution set of transmission elements TEs, U is the set of clients that is covered by A, client j being covered by TE (b, m), if $\gamma_j^b > \bar{\gamma}_m$, where $\gamma_j^b$ is the SNR value of client j when beam b is employed and $\bar{\gamma}_m$ is the minimum SNR value for a client to be able to receive MCS m, client j being covered by A, if j is covered by at least one TE in A.

11. The method of claim 9, wherein said finding most efficient transmission element TE comprises a normalized cost of TE (b, m) is computed as $$\frac{\left\lceil \frac{L}{r_m} \right\rceil}{S_A(b, m)}$$

where L is the data length, $r_m$ is the channel SA(b,m) rate of one slot with MCS m, SA (b, m) is the set of the clients who are not previously covered by A but are covered by the TE (b, m), and a most efficient said TE being said TE with a smallest normalized cost.

* * * * *